United States Patent
Wall

[15] 3,677,538
[45] July 18, 1972

[54] AUTOMATIC DOFFER FOR ARTICLES ADHERED TO A CONVEYOR BELT

[72] Inventor: Thomas M. Wall, Halawaka Creek, Ala.
[73] Assignee: West Point-Pepperell Inc., West Point, Ga.
[22] Filed: Aug. 31, 1970
[21] Appl. No.: 68,079

[52] U.S. Cl. ................................271/76, 271/45, 271/DIG. 2
[51] Int. Cl. ........................................................B65h 29/16
[58] Field of Search .....................271/76, DIG. 2, 75, 77, 78, 271/45, 69, 7

[56] References Cited

UNITED STATES PATENTS

| | | | |
|---|---|---|---|
| 3,450,402 | 6/1969 | Weiler | 271/DIG. 2 |
| 1,517,739 | 12/1924 | Lotz | 271/DIG. 2 |
| 1,283,889 | 11/1918 | Pope | 271/DIG. 2 |
| 2,822,170 | 2/1958 | Frantz | 271/76 X |
| 1,448,173 | 3/1923 | Wright et al. | 271/75 |
| 2,261,971 | 11/1941 | Matthews | 271/76 X |
| 1,669,552 | 5/1928 | Brunk | 271/DIG. 2 |

Primary Examiner—Evon C. Blunk
Assistant Examiner—Bruce H. Stoner, Jr.
Attorney—Cushman, Darby & Cushman

[57] ABSTRACT

Method and means for automatically transferring articles from a conveyor belt when the articles are adhered thereto. The articles are shown as being flat and flexible or drapable. The adhesion between the belt and the leading edge of the article is first automatically broken and then the separated leading edge is pulled and guided away from the end of the conveyor. Special exemplary means are disclosed which include a reciprocating blade for breaking loose the leading edge and interleaved doffer belts and guide combs for pulling and guiding the articles from the belt. Pressurized gases may also be blown under the separated leading edge and onto the trailing edge for facilitating the operations.

7 Claims, 2 Drawing Figures

Patented July 18, 1972
3,677,538
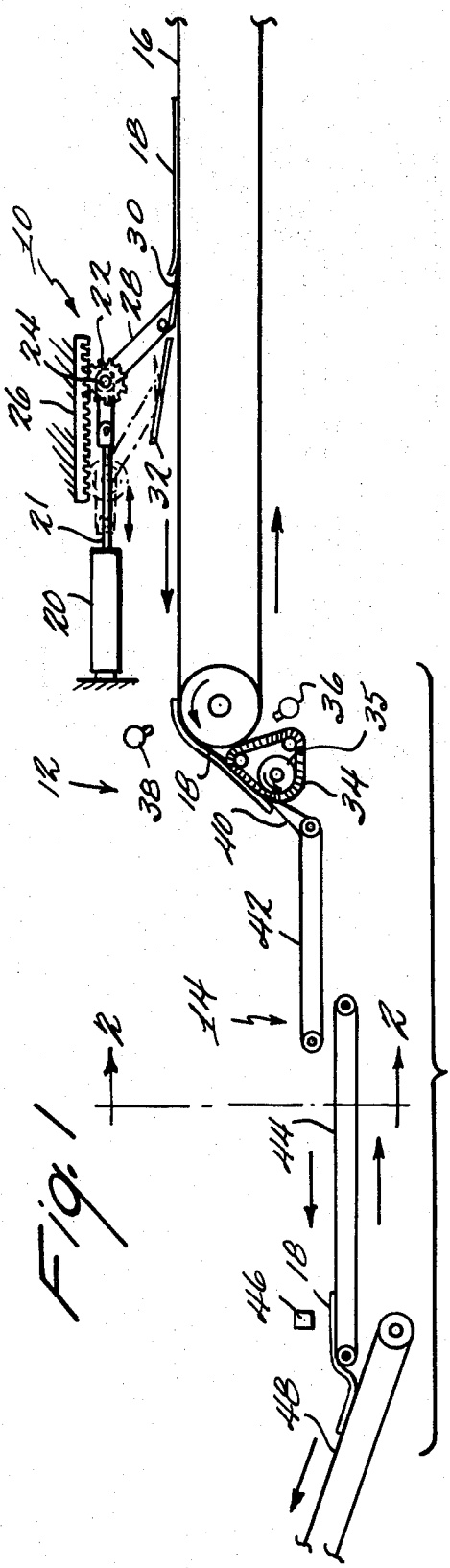
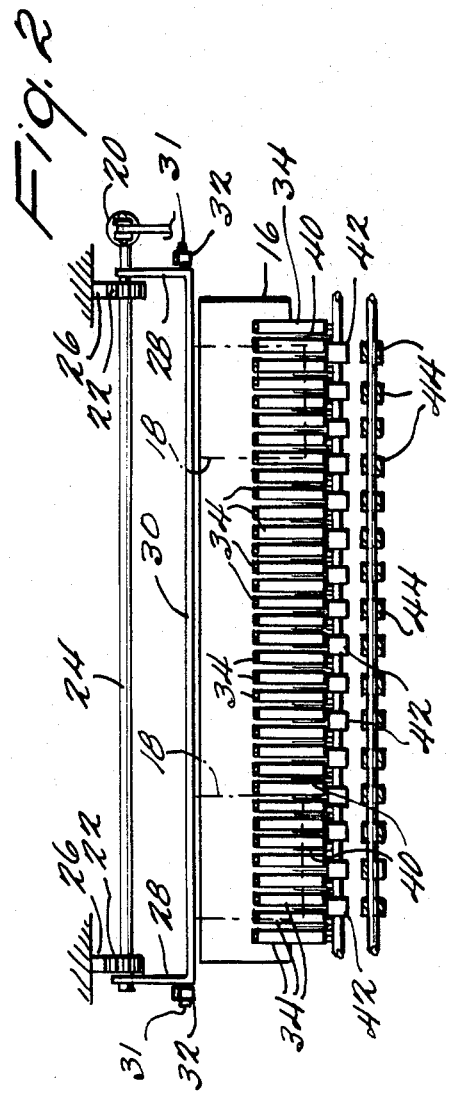
INVENTOR
THOMAS M. WALL
BY Cushman, Darby & Cushman
ATTORNEYS

AUTOMATIC DOFFER FOR ARTICLES ADHERED TO A CONVEYOR BELT

This invention generally relates to means and methods for automatically transferring adhered articles, especially of a flat and drapable character, from a conveyor belt.

In a conventional process for the making of printed articles, such as towels or washcloths, the articles are held firmly to a conveyor belt by an adhesive during the printing process. This is necessary to hold the unit print body firmly in place to keep it in register and thus prevent a smeared or distorted pattern. Thereafter it is necessary to remove the printed article from the conveyor belt and transfer it to a drying process. In the past, this removal has been a time-consuming manual operation.

Accordingly, it is an object of this invention to provide a novel method and means for automatically transferring such adhered articles from the conveyor belt thereby eliminating this manual operation and lessening the possibility of a print smear before drying and permitting tandem operation of the unit screen print machine and the dryer to result in more uniform drying and curing of the unit print.

According to this invention, the leading edge of such an adhered article is first automatically separated from the conveyor belt and then this separated leading edge is pulled and guided away from the end of the conveyor belt. Specifically, the separation of the leading edge in the exemplary embodiment is accomplished by a reciprocating blade structure suspended over the conveyor. In that embodiment, the pulling and guiding steps are carried forth by a plurality of doffer belts interleaved with comb teeth. These doffer belts are shown disposed at the discharge end of the belt and therebelow. In addition, jets of pressurized gas are utilized in that embodiment to keep the leading edge separated sufficiently to enter upon the doffer belts properly while similar jets are used to keep the trailing edge from folding down over itself during the doffing process.

Further objects of the invention will be evident from the following description.

A more complete and detailed understanding of the invention may be obtained from the following detailed description in conjunction with the drawings, of which:

FIG. 1 is a side-elevational, schematic view of an exemplary embodiment of apparatus for use in practicing this invention, and FIG. 2 is an end view of the apparatus shown in FIG. 1, and with articles indicated in phantom lines thereon.

Referring to FIG. 1, the exemplary embodiment shown therein comprises at least three sections. There is an adhesion breaker mechanism 10, a doffer mechanism 12 and a transfer mechanism 14 for transferring the articles away from the doffer 12.

An adhesive coated conveyor 16 indexes to the left in FIG. 1 at fixed intervals moving an adhered unit print body or article 18 with it. In actual practice several separate articles may be located in spaced apart relation on the conveyor belt as will be apparent to those skilled in the art. When conveyor 16 is stopped, air cylinder 20 conventionally moves piston rod 21 to the right causing pinion 22 to rotate counter-clockwise along a fixed guide rack 26. Linear motion of shaft 24 is transmitted by spaced and parallel connecting links 28 to an edge lifter blade 30 which then moves down and to the right to contact the leading edge of unit print body 18.

Pinion 22 is suitably rotatably mounted at the free end of the piston rod 21, as by shaft 24, as shown. The links 28 are also pivotable about the axis of shaft 24 and carry the lifter blade 30, as shown. Each link 28 has a lug 31 thereon riding on a guide ramp or plate 32 disposed on either side of belt 16, as seen in FIG. 2. As will be evident, the weight of links 28 and blade 30 will urge the lugs 31 to stay in contact with ramps 32. Other suitable means may be employed for that purpose, if desired.

The edge lifter blade 30, when in the down position, breaks the adhesion of unit print 18 by its wedging action between the unit print body 18 and the adhesive coated conveyor 16. Air cylinder 20 then reverses and moves the piston 21 to the left taking the edge lifter blade 30 back to the left up guide ramp 32 in action which is just the reverse of that already described. This completes one cycle of operation for the adhesion breaker mechanism 10.

As the adhesive coated conveyor 16 indexes to the left at fixed intervals, unit print body 18 is still firmly adhered to conveyor 16 except for the leading edge which has been loosened by the adhesion breaker mechanism 10 as previously described.

The doffer mechanism 12 also operates each time conveyor 16 indexes to the left in FIG. 1 and continues to operate until stopped by a conventional adjustable time delay unit. Of course, other means for stopping the doffer mechanism will be apparent to those skilled in the art or the doffer mechanism may run continuously, if desired.

As unit print body 18 passes around the left hand end of conveyor 16 (as shown in FIG. 1), the loosened leading edge of unit print body 18 is pulled onto parallel and spaced doffer belts 34, as shown. The belts 34 are constructed and arranged as shown in FIGS. 1 and 2, and are driven by a drive pulley means 35 to run counter-clockwise as viewed in FIG. 1 (same direction as conveyor 16) at a slightly higher surface speed than conveyor 16 thus insuring against material bunching between doffer belts 34 and the end of conveyor belt 16.

The separating action of the doffer belts 34 is assisted by air jet 36 blowing between the end of conveyor 16 and the doffer belts 34, as shown in FIG. 1. In addition, another air jet 38 is shown arranged to blow down on the unit print body 18 to prevent the trailing edge thereof from folding over itself as it leaves conveyor 16.

Combs 40 are interspaced or interleaved with doffer belts 34 and are arranged so that the tips thereof ride below the surface of doffer belts 34, as shown in FIG. 1. These interleaved comb teeth 40 guide unit print body 18 onto transfer belts 42 which are moving to the left as shown in FIG. 1, between combs 40 at a slightly higher surface speed than doffer belts 34. The unit print body 18 is then carried to the left by the transfer belts 42 for suitable deposition on further transfer belts 44 which, in turn, move to the left at a slightly higher surface speed than belts 42.

Just prior to reaching the left hand end of belts 44, as seen in FIG. 1, unit print body 18 passes under a suitable sensing device 46 (such as a photoelectric mechanism) that senses its presence and immediately adjusts the surface speed of transfer belts 44 to slightly less than the surface speed of a conventional dryer conveyor 48. A conventional adjustable time delay unit (not shown) holds transfer belts 44 at that speed until the unit print body (or bodies) 18 is (or are) safely deposited onto dryer conveyor 48 before resuming normal speed.

Although the operation of the invention should be evident from the foregoing description, a brief summary thereof follows for convenience and to facilitate an understanding thereof:

In operation, conveyor belt 16, with spaced apart flat and drapable articles 18, adhered thereto, indexes to the left (as viewed in FIG. 1) at fixed intervals. At the end of each indexing step, air cylinder 20 moves shaft 24 to the right which results in edge lifting blade 30 moving to the right and down to the conveyor surface to wedge between the leading edge of articles 18 and the surface of conveyor belt 16. Thereafter, the air cylinder 20 retracts and the blade 30 is pulled up and to the left as is evident. (The retracted position of links 28, blade 30 and pinion 22 is indicated in phantom lines in FIG. 1.)

Conveyor 16 continues to index to the left as viewed in FIG. 1, until the separated leading edges of articles 18 pass over the left end of the conveyor 16. Here the leading edges are passed onto the doffer belts 34 which move to the left at a slightly higher surface speed than conveyor 16. Air jets 36 help insure this by blowing between the doffer belts and the end of the conveyor.

As both the conveyor belt 16 and the doffer belts 34 continue to move, the articles are pulled from the end of conveyor 16 and onto doffing belts 34. Air jets 38 play upon the trailing edge of the article as it is being removed to prevent this trailing edge from folding down over itself.

From doffer belts 34, the print bodies 18 are guided onto transfer conveyor belts 42 by comb teeth 40 interleaved between the doffer belts 34 and the transfer belts 42. Thereafter, the unit print bodies are transferred to belts 44 and onto drying conveyor 48.

Suitable, conventional structures (not shown) may be provided to insure that the unit print bodies are transferred from belts 42 to belts 44 and then to belts 48 without bunching, as will be apparent to those skilled in the art.

Although only one embodiment of apparatus for practicing this invention has been particularly described above, many modifications of this apparatus will be readily apparent to those skilled in the art for practicing the basic method of this invention. Accordingly, all such modifications are intended to be within the scope of this invention.

What is claimed is:

1. Apparatus for automatically removing adhered articles from a conveyor belt, said apparatus comprising:
   edge lifter means for breaking the adhesion between said belt and a leading edge of said article thereby separating said leading edge from said belt,
   doffing means for pulling and guiding the leading edge of said separated article away from the end of said belt thereby removing said article,
   said doffing means including belt means disposed adjacent and below the discharge end of said first-named belt and also running at a higher speed,
   first air blowing means for blowing pressurized gas under said separated leading edge as it passes over the end of said conveyor to help keep the leading edge separated from said belt during said pulling and guiding step, and
   second air blowing means for blowing pressurized gas onto the trailing edge of said article to keep the trailing edge from folding over itself as the article is removed from the conveyor belt.

2. Apparatus as in claim 1, wherein said edge lifter means comprises:
   a wedge-shaped blade, and
   means for moving said blade under the leading edge of said article and for retracting said blade after breaking the adhesion between said belt and said leading edge.

3. Apparatus as in claim 2, wherein said doffing means comprises:
   a plurality of aligned doffer belts disposed at the end of said conveyor belt and mounted for movement to pull said article away from the end of said conveyor, and
   a doffer comb tooth disposed between at least some of said doffer belts for guiding said articles off said doffer belts.

4. Apparatus as in claim 3, wherein said doffer belts are adapted for movement at a slightly higher surface speed than said conveyor belt.

5. Apparatus as in claim 4, including at least one transfer belt for transferring said separated articles away from said doffing means at a surface speed slightly higher than that of said doffer belts.

6. Apparatus for automatically removing adhered articles from a conveyor belt, said apparatus comprising:
   edge lifter means for breaking the adhesion between said belt and a leading edge of said article thereby separating said leading edge from said belt, and
   doffing means for pulling and guiding the leading edge of said separated article away from the end of said belt thereby removing said article.
   said edge lifter means comprising:
   a wedge-shaped blade, and
   means for moving said blade under the leading edge of said article and for retracting said blade after breaking the adhesion between said belt and said leading edge,
   said doffing means comprising:
   a plurality of aligned doffer belts disposed at the end of said conveyor belt and mounted for movement to pull said article away from the end of said conveyor, and
   a doffer comb tooth disposed between at least some of said doffer belts for guiding said articles off said doffer belts, said doffer belts being adapted for movement at a slightly higher surface speed than said conveyor belt,
   said means for moving said blade comprising:
   at least one link arm attached at a first end to said blade,
   traversing means pivotally attached to said link arm at its other end for moving said arm, and
   guide means for guiding said blade into position between the leading edge of said article and said conveyor belt surface in response to said arm movements caused by said traversing means.

7. A method for automatically removing articles of a flat and flexible character adhered to a conveyor belt, said method comprising the steps of:
   breaking the adhesion between said belt and a leading edge of said article by moving a wedge shaped edge lifter under said leading edge, thereby separating said leading edge from said belt,
   pulling and guiding the separated leading edge of said article away from the end of said belt by a doffing belt means running at a faster speed than said first-named belt and disposed therebelow thereby removing said article,
   blowing pressurized gas under said separated leading edge as it passes over the end of said conveyor to help keep the leading edge separated from said belt during said pulling and guiding step, and
   also blowing pressurized gas onto the trailing edge of said article to keep the trailing edge from folding over itself as the article is removed from the conveyor belt.

* * * * *